Aug. 26, 1958 J. LEHMANN 2,849,181

TIME-DIVISION COMPUTING DEVICE

Filed March 1, 1954 3 Sheets-Sheet 1

INVENTOR.
Jules Lehmann

BY Morris Rabkin
ATTORNEY

Aug. 26, 1958 J. LEHMANN 2,849,181

TIME-DIVISION COMPUTING DEVICE

Filed March 1, 1954 3 Sheets-Sheet 2

INVENTOR.

Jules Lehmann

BY Morris A. Rabkin

ATTORNEY

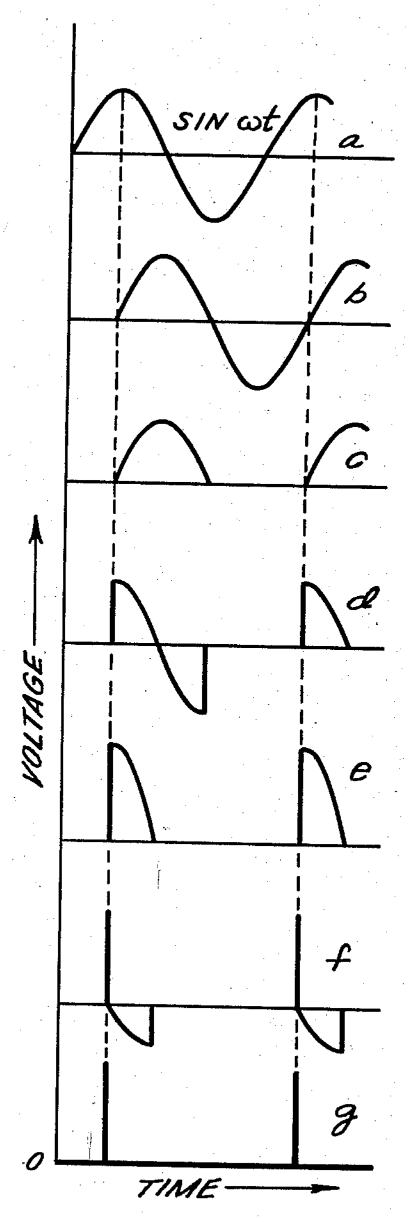
Fig. 4.
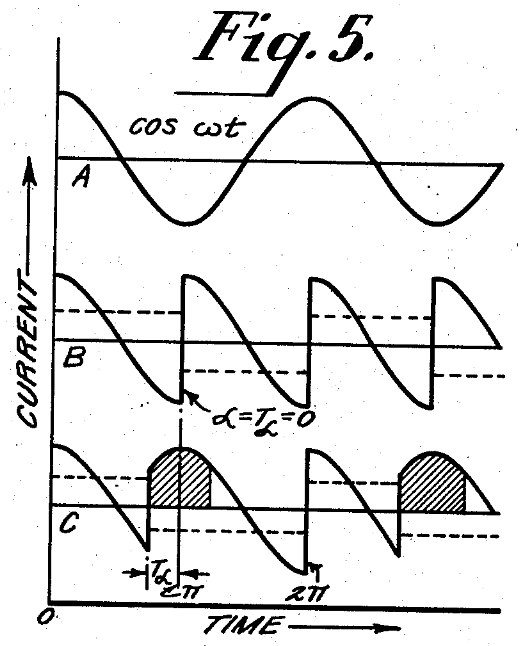
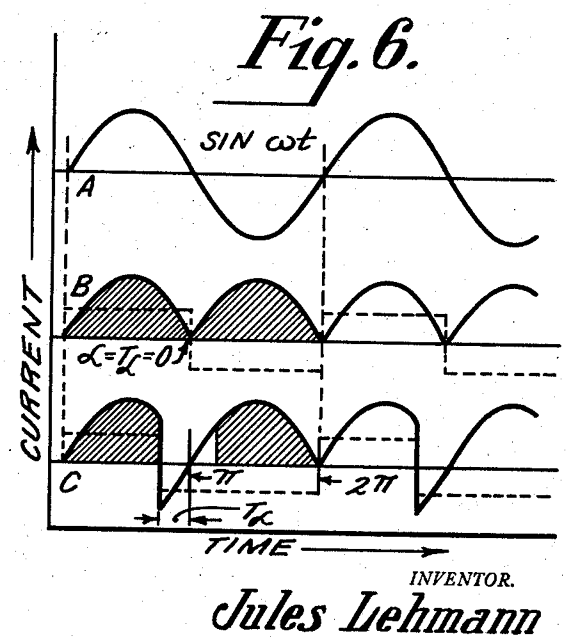
INVENTOR.
Jules Lehmann
BY Morris A. Rabin
ATTORNEY United States Patent Office
2,849,181
Patented Aug. 26, 1958

2,849,181

TIME-DIVISION COMPUTING DEVICE

Jules Lehmann, Trenton, N. J., assignor to Radio Corporation of America, a corporation of Delaware Application March 1, 1954, Serial No. 413,233
16 Claims. (Cl. 235—61)

This invention relates to computer systems, and particularly to time-division or pulsed attenuator analogue computers and apparatus for deriving mathematical functions.

Presently known time-division and pulsed attenuator, computers are described in the patent to A. W. Vance, No. 2,661,153; in the article by E. A. Goldberg in the RCA Review, September, 1952, page 265; in the article by Morrill and Baum in Electronics, December 1952, page 139; in the book, "Electronic Instruments," by Greenwood, et al., Radiation Laboratory Series, McGraw-Hill, volume 21, chapter 3, page 50; and in the book "Electronic Analog Computers" by Korn and Korn, McGraw-Hill, Chapter 6, page 223.

Certain of the computers of the aforementioned type, such as those described in the above noted books, are limited in the accuracy which can be attained. Others of the computers of the aforementioned type generate a train of rectangular pulses in which the ratio of pulse length to period is a function of a variable, and the period of the pulse train varies with the variable. As a result of the variable period or frequency of the pulse train, computers of this type cannot be used as conveniently in apparatus where a constant frequency pulse train is required. Computer apparatus employing a constant frequency pulse train is described below. In time-division computers having a variable frequency, problems of frequency range and circuit stability often arise.

Accordingly, it is an object of this invention to provide a time-division computer that operates with great accuracy and has wide application.

Another object of this invention is to provide a new and improved time-division computer that is reliable and accurate.

Another object of this invention is to provide a new and improved time-division computer that operates at a constant frequency and is extremely accurate and reliable.

Known apparatus for obtaining a voltage representative of the sine and cosine of an angle such as angle resolvers, or sine-wound and specially-driven potentiometers are generally difficult and expensive to manufacture where a high degree of accuracy is required. Furthermore, apparatus such as angle resolvers employing electromechanical components, are relatively slow in operation and difficult to maintain. Similar limitations exist in known apparatus for deriving other mathematical functions.

Another object of this invention is to provide new and improved apparatus for determining trigonometric functions of an angle that is accurate and fast in operation.

Another object of this invention is to provide an improved and reliable apparatus for deriving mathematical functions that does not depend on the use of electromechanical components.

Another object of this invention is to provide electronic apparatus for deriving mathematical functions that operates rapidly and with a high degree of accuracy.

In accordance with this invention, a time-division computing device having a constant frequency is provided by employing an integrator in a feedback circuit. A current proportional to a first variable voltage is fed to the input of the integrator. Switching means is provided for alternately coupling two sources of constant currents of opposite polarities to the integrator input. A multi-vibrator circuit, responsive to the amplitude in the integrator output and to trigger pulses of constant frequency, generates at the same constant repetition frequency a train of rectangular switching pulses. The duration of the switching pulses varies in accordance with the integrator output. The switching pulses are fed back to the switching means to control the coupling of the constant current sources so that the resultant current to the integrator input is reduced to zero. Accordingly, the durations of the switching pulses are proportionally related to the first variable.

An output proportional to the product of the first variable voltage and a second variable voltage is produced by employing a second or slave switching means which is also controlled by the rectangular switching pulses. Sources of current proportional to the second variable and of opposite polarities are alternately coupled to an output amplifier in accordance with the rectangular pulses. Accordingly, the resultant output produced has a direct current content proportional to the product of the first and second variables.

An output voltage proportional to a mathematical function of an input voltage, such as the sine or cosine, can be produced, in accordance with this invention, by employing a time-division computer having a constant frequency such as that described above. The computer generates at a constant frequency a train of rectangular switching pulses whose durations vary in accordance with the input voltage. A source of periodic voltages which is a mathematic function of time is intermittently coupled to an output by a switching means controlled by the switching pulses. The frequency of the periodic voltages is harmonically related to the switching pulse frequency. Accordingly, the output is proportional to the mathematical function of the input voltage.

The foregoing and other objects, the advantages and novel features of this invention, as well as the invention itself, both as to its organization and mode of operation, may be best understood when read together with the accompanying drawing, in which like reference numerals refer to like parts, and in which:

Figure 4 is an idealized graph of waveforms produced in the circuit of Figure 3;

Figure 5 is an idealized graph of waveforms produced in the circuit of Figure 3;

Figure 6 is an idealized graph of waveforms produced in a modified form of the circuit of Figure 3.

Figure 1:
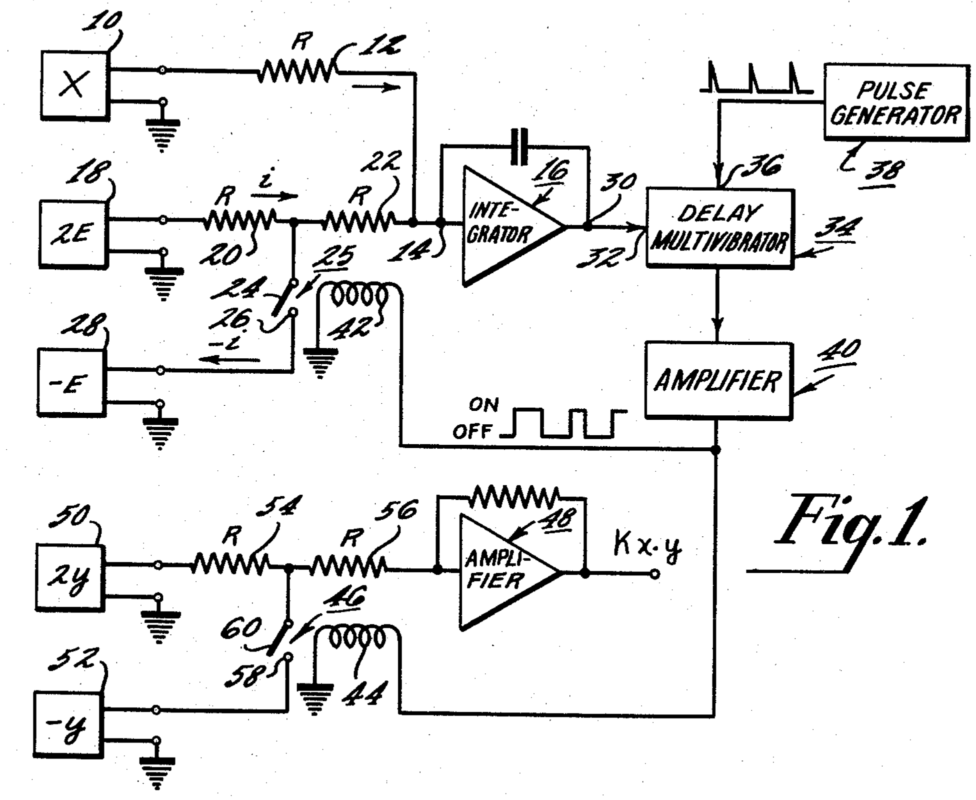
Figure 1 is a schematic block circuit diagram of an embodiment of this invention.

Referring to Figure 1, a source 10 of varying voltage proportional to a first variable X is connected through a resistor 12 to the input 14 of an integrator 16. A source 18 of constant voltage +2E is connected through two resistors 20, 22 in series to the integrator input 14. The junction of the series resistors 20, 22 is connected to the movable contact 24 of a single-pole, single-throw relay switch 25. The fixed switch contact 26 is connected to a source 28 of constant voltage −E. The output 30 of the integrator 16 is connected to one delay control input 32 of a two-input delay multivibrator 34. The other input 36 of the delay multivibrator 34 is connected to a source 38 of triggering pulses having a constant repetition frequency that controls the repetition frequency of the delay multivibrator output. The output of the multivibrator 34 is amplified in an amplifier 40 and applied to the relay coil 42 completing a feedback circuit. An appropriate form of delay multivibrator is shown in the book "Electronic Instruments" cited above. The delay multivibrator 34 is a circuit that generates a train of rectangular waves at the frequency of the triggering pulses from the pulse generator 38. The rectangular waves rise at the triggering time and fall after a duration or delay that varies with the amplitude of the voltage applied to the first input 32. For the feedback circuit of Figure 1, the delay multivibrator 34 output pulse increases in duration as the integrator 16 output decreases.

The delay multivibrator 34 output is also applied through the relay drive amplifier 40 to the coil 44 of a second or slave relay 46. The slave relay 46 controls the coupling to an output amplifier 48 of two sources 50, 52 of varying voltage that are proportional to a second variable Y. The first source +2Y is connected through two resistors 54, 56 in series to the output amplifier 48. The second source −Y is connected to the fixed switch contact 58 of the slave relay 46 and through the movable contact 60 to the junction of the series resistors 54, 56.

The integrator 16 and relay drive amplifier 40 may be of the type described in the Vance patent noted above. The relay switches 25, 46 may be replaced by electronic switches, appropriate forms of which are described in the articles by Goldberg and Morrill noted above.

The gain of the integrator 16 may be considered to be infinite. Therefore, the feedback circuit, made up of the integrator 16, the delay multivibrator 34 and the relay 25, adjusts itself quickly to reduce the current feeding into the integrator input 14 to a zero value. Considering the condition when the first variable X has a zero value, the current feeding into the integrator 16 with the switch 25 open is $$\frac{+2E}{2R}$$

and with the switch 25 closed, it is $$\frac{-E}{R}$$

Therefore, the switch 25 is open and closed for equal time periods to produce a resultant zero current to the integrator input. The relay coil 42 is energized and the switch 25 is closed during the positive portion of the rectangular wave generated by the delay multivibrator 34. During the negative portion of the rectangular wave, the switch 25 is open. Accordingly, for X having a zero value, each cycle of the rectangular wave has equal positive and negative portions, as shown in line A of Figure 2.

Figure 2:
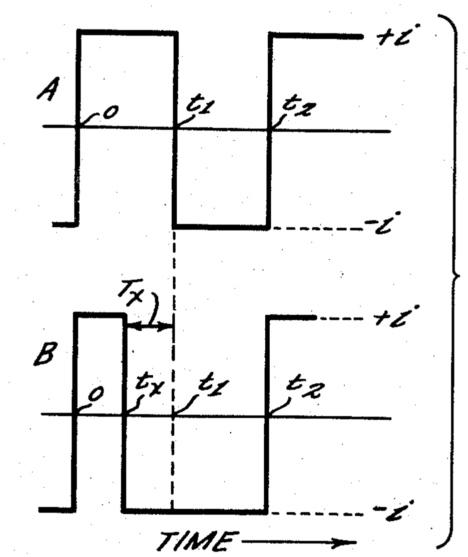
Figure 2 is an idealized graph of waveforms produced in the circuit of Figure 1.

For the general case of X having a value other than zero, the positive and negative portions of the rectangular wave are unequal, as shown in line B of Figure 2. Since the resultant current into the integrator input is zero over the period of a rectangular wave cycle, then $$\frac{X}{R}t_2-\frac{E}{R}t_x+\frac{2E}{2R}(t_2-tx)=0$$

where $t_2$ is the time period of a rectangular wave cycle, and $t_x$ is the duration of the positive rectangular pulse. Consequently, solving for X, one finds X is proportional to $$E(t_2-2t_x)=2ET_x$$

where $T_x$ is the time shift of the trailing edge of the positive pulse.

The slave relay 46 is driven in synchronism with the feedback relay 25. Therefore, the resultant current fed into the output amplifier is proportional to $$\frac{-Y}{R}t_x+\frac{2Y}{2R}(t_2-t_x)=\frac{2Y}{R}T_x$$

Substituting for $T_x$, the proportionality of X, the resultant output current or voltage is, therefore, equal to K·X·Y, where K is a constant depending on the value of E and R. Accordingly, the circuit shown in Figure 1 may be used as a multiplier.

Figure 3:
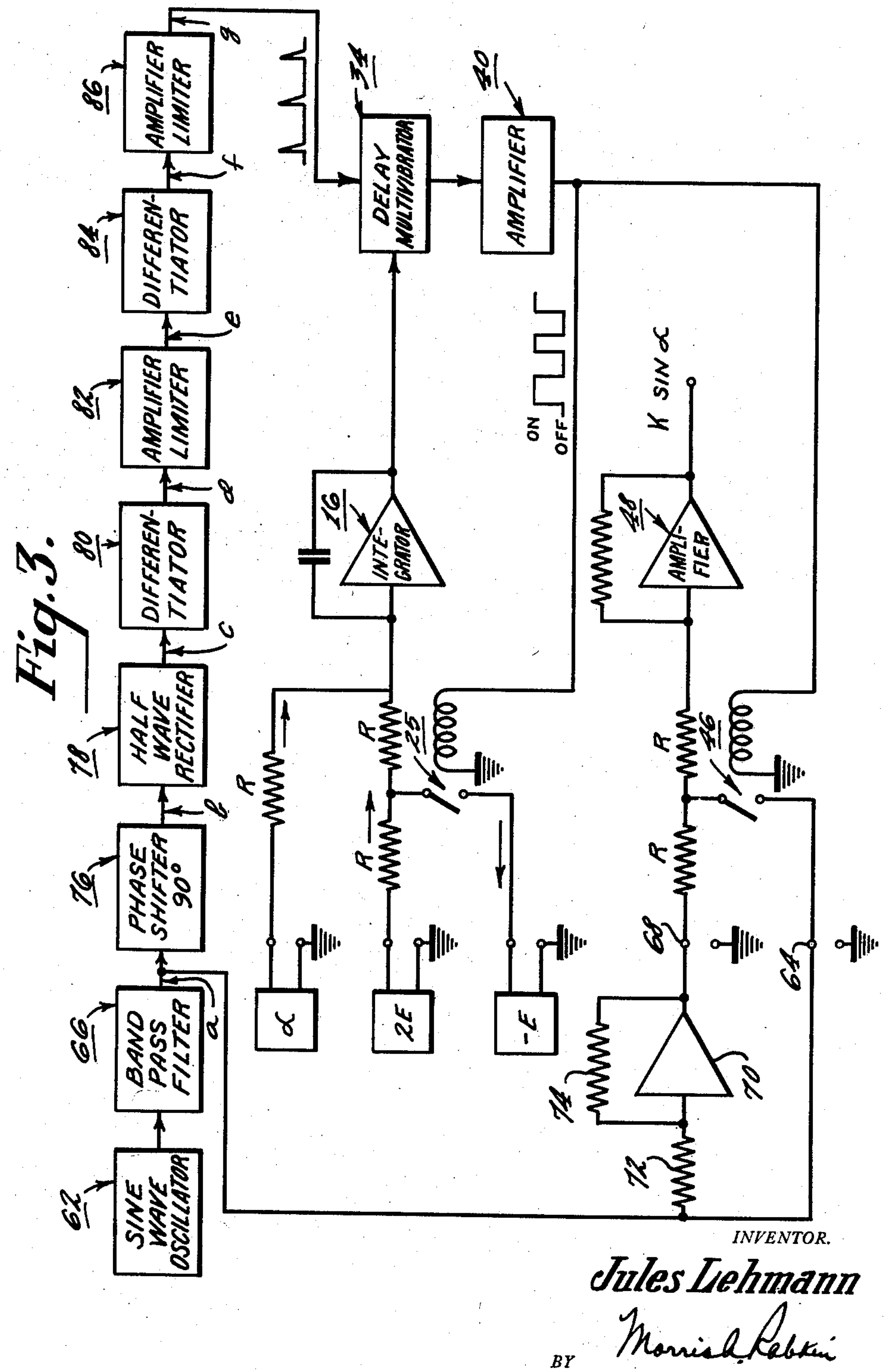
Figure 3 is a schematic block circuit diagram of another embodiment of this invention.

In Figure 3, another embodiment of this invention is shown by means of which a mathematical function of a variable, such as the sine of an angle, is produced. The time-division computer described above is employed in the embodiment shown in Figure 3, and the same reference numerals correspond to the circuit elements previously described. A current proportional to a variable angle $\alpha$ is fed to the integrator 16 together with standard currents of opposite polarities $$\frac{E}{R}$$

and $$\frac{-E}{R}$$

in the manner described above. A sine wave oscillator 62 is connected to one of the slave unit inputs 64 through a band pass filter 66 that eliminates undesirable harmonics. The sine wave oscillator 62 generating a sine wave sin $\omega t$ is also connected to the other input 68 of the slave unit through a phase-reversing amplifier 70. By an appropriate choice of input and feedback resistors 72, 74 of the phase-reversing amplifier, the sine wave amplitude is modified by a factor of two. By means of a suitable circuit, such, for example, as that of the phase-reversing amplifier 70, and the feedback and input resistors 74 and 72, the two sources of voltage for 2E and −E in Figure 3 may be provided from a single source, and, similarly, the sources 18, 28 and the sources 50, 52 in Figure 1 may be respectively provided from separate single voltage sources.

A train of trigger pulses of the same frequency as the sine wave is provided for triggering the delay multivibrator 34. The trigger pulses may be produced from the sine wave by the arrangement shown in Figure 3. Waveforms occurring at various portions of the circuit are shown in Figure 4 with reference letters corresponding to those in Figure 3. The filtered sine wave (as at *a*) is applied to a 90° phase shifter 76 which may include an appropriate form of reactance. The phase shifted sine wave as at *b* is rectified in a half-wave rectifier 78 to remove the negative portion of the sine wave. The rectified wave (as at *c*) is differentiated by a differentiator circuit 80 to produce a sharp leading edge (as at *d*). The negative going portion of the differentiated wave is removed by an amplifier limiter 82. The resultant wave (as at *e*) is then passed through another differentiator 84 and limiter 86 to provide a train of extremely sharp trigger pulses (as at *g*). Due to the phase shift of 90°, the original sine wave is a cosine wave when time referenced to the trigger pulses.

The rectangular switching pulses produced by the delay multivibrator 34 have durations in accordance with the variable voltage $\alpha$ in the manner described above. That is, the shift $T\alpha$ of the trailing edge of the pulse is proportional to $\alpha$. In Figure 5A, the input cosine wave cos $\omega t$ is shown zero-time referenced to the trigger pulses. In Figure 5B and C, there are shown graphically the switching pulses in broken lines, and, in full lines, the currents fed to the output amplifier 48 that produce an output proportional to sine $\alpha$. When the angle $\alpha$ is zero, the positive and negative portions of the rectangular wave are equal, as shown in Figure 5B, and the slave switch 46 is on and off for equal time intervals. Therefore, for the first half of the switching cycle, the output current corresponds to the cosine wave cos $\omega t$; and for the second half of the switching cycle, the output current is of opposite polarity. From the symmetry of the graph of Figure 5B, it is evident that the resultant direct current over the period of the switching cycle is zero. For the general case of $\alpha$ not equal to zero, there is a time shift $T\alpha$ of the trailing edge of the pulse proportional to $\alpha$. The currents fed to the output amplifier 48 during the two portions of the switching cycle are unequal, as shown in Figure 5C. The resultant direct current over the period of the switching cycle is shown by the hatched area in Figure 5C. This resultant current is proportional to $$2\int_{\pi-\alpha}^{\pi} \cos \omega t \, dt = \frac{2}{\omega} \sin \alpha = K_1 \sin \alpha$$

where $K_1$ is the constant $$\frac{2}{\omega}$$

Accordingly, the direct output voltage produced by the output amplifier is proportional to the sine of the input voltage $\alpha$.

The apparatus shown in Figure 3 may also be used to produce the cosine of an input voltage $\alpha$. In this case, the switching pulses are in phase with the sine wave sin $\omega t$ (as shown in Figure 6). Consequently, the phase shifter 76 is omitted in deriving the trigger pulses. When $\alpha$ is zero, the output waveform of Figure 6B is produced. The resultant output over the period of a cycle is proportional to $$2\int_{0}^{\pi} \sin \omega t \, dt = \frac{2}{\omega}(\cos 0 - \cos \pi) = \frac{4}{\omega} = K_1 + K_1 \cos 0$$

Where $\alpha$ is not equal to zero (Figure 6C), the resultant output over a cycle is proportional to $$2\int_{0}^{\pi-\alpha} \sin \omega t \, dt = \frac{2}{\omega}(1 + \cos \alpha) = K_1 + K_1 \cos \alpha$$

The constant term $K_1$ can be subtracted from the cosine output by feeding a constant negative current $K_1$ into the output amplifier 48.

The circuit of Figure 3 may also be used to derive inverse functions of a variable voltage. For example, the arcsine of a variable X may be derived by applying constant voltages proportional to 2E and —E to the slave unit inputs 64, 68, by feeding a current proportional to the variable X into the integrator 16, and by switching currents proportional to +cos $\omega t$ and —cos $\omega t$ into the integrator 16 by means of the feedback relay 25. The resultant current switched into the integrator by the feedback relay 25 is proportional to $$2\int_{0}^{\pi-T_x} \cos \omega t \, dt = \frac{2}{\omega} \sin T_x = X$$

Accordingly, $T_x$ can be made proportional to the arcsine of X by choice of appropriate circuit constants. The resultant of the constant currents switched into the output amplifier 48 by the slave relay 46 is proportional to $T_x$ and, therefore, proportional to arcsine X.

The sine or cosine of multiples or fractions of an angle may also be derived with apparatus embodying this invention. For example, if the switching pulses have a unit frequency and the cosine wave has a double frequency, two cosine wave cycles occur for each switching pulse cycle. Consequently, in the switching pulse period $T\alpha$, the portion of the double-frequency cosine wave that is generated is twice the portion that would be generated by a unit-frequency cosine wave. Thus, the resultant output current produced by a double-frequency cosine wave would correspond to an integration over twice the angle corresponding to $T\alpha$. Accordingly, the resultant output would be proportional to the sine of $2\alpha$. In a similar manner, by appropriate ratios of sine wave frequency and switching pulse frequency the trigonometric functions of those ratios of angles may be derived.

This invention is not limited to deriving trigonometric functions. Other mathematical functions of a variable for which periodic waves can be generated my also be derived in a similar manner. For example, a waveform that is a mathematical function of time may be periodically generated by any appropriate function generator. The mathematical function of a variable may then be derived by applying the periodic waveform to the time-division computer in the manner described above.

This invention of deriving mathematical functions from a periodic wave may employ other time-division computers having a constant frequency, such as those described in the books noted above. However, where a high degree of accuracy is desired, the time-division computer described above is preferred.

It is evident from the above description of this invention that a time-division computer is provided that operates with a constant frequency and is extremely reliable and accurate. Accurate and fast operating apparatus is provided for determining trigonometric functions of an angle or for deriving various mathematical functions of a variable. The apparatus of this invention does not depend upon the use of electro-mechanical components.

What is claimed is:

1. In combination, first input means for producing two sets of first signals of different values in accordance with a first input voltage, second input means for producing second signals in accordance with a second input voltage, means to which said first and second signals are applied for producing additional signals that vary in accordance with the algebraic sum of said first and second signals, and means responsive to said additional signals for switching alternately one and the other of said first signals of different values to said additional signal producing means to make said algebraic signal sum substantially zero, said switching means including a circuit for generating at a constant repetition frequency switching signals to actuate the alternate switching of said first signals, said circuit being responsive to said additional signals for providing said switching signals with a varying characteristic in accordance with said additional signals.

2. In combination, first input means for producing two sets of first signals of different values in accordance with a first input voltage, second input means for producing second signals in accordance with a second input voltage, means to which said first and second signals are applied for producing additional signals that vary in accordance with the algebraic sum of said first and second signals, means responsive to said additional signals for switching alternately one and the other of said first signals of different values to said additional signal producing means to make said algebraic signal sum substantially zero, said switching means including a circuit for generating at a constant repetition frequency switching signals to actuate the alternate switching of said first signals, said circuit being responsive to said additional signals for providing said switching signals with a varying characteristic in accordance with said additional signals, third input means for producing two sets of third signals of different values in accordance with a third input voltage, an output terminal, and additional switching means responsive to said switching signals for switching alternately one and the other of said third signals of different values to said output terminal.

3. In combination, input means for producing a current that varies in accordance with a variable input signal, means for producing standard currents of opposite polarities, means coupled to both of said current producing means for producing voltages that vary in accordance with the algebraic sum of said input signal and said standard currents, and means responsive to said varying voltages for switching alternately one and the other of said standard currents to said voltage producing means to make said algebraic signal sum substantially zero, said switching means including a circuit for generating at a constant repetition frequency switching signals to actuate the alternate switching of said standard currents, said circuit being responsive to said varying voltages for providing said switching signals with a varying cycle characteristic in accordance with said varying voltages.

4. The combination recited in claim 3 wherein said means for producing varying voltages includes an integrator circuit, and said circuit for generating switching signals includes a multivibrator circuit responsive to the amplitudes of said varying voltages for generating rectangular waves having a duration related to said varying voltage amplitudes.

5. In combination, input means for producing a current that varies in accordance with a variable input signal, means for producing standard currents of opposite polarities, means coupled to both of said current producing means for producing voltages that vary in accordance with the algebraic sum of said input signal current and said standard currents, means responsive to said varying voltages for switching alternately one and the other of said standard currents to said voltage producing means to make said algebraic signal sum substantially zero, said switching means including a circuit for generating at a constant repetition frequency switching signals to actuate the alternate switching of said standard currents, said circuit being responsive to said varying voltages for providing said switching signals with a varying cycle characteristic in accordance with said varying voltages, additional input means for producing additional currents of opposite polarities that vary in accordance with another variable input signal, an output terminal, and additional switching means responsive to said switching signals for switching alternately one and the other of said additional currents of opposite polarities to said output terminal.

6. The combination recited in claim 5 wherein said means for producing varying voltages includes an integrator circuit, and said circuit for generating switching signals includes a multivibrator circuit responsive to the amplitudes of said varying voltages for generating rectangular waves having a duration related to said varying voltage amplitudes.

7. Computing apparatus comprising an integrator, means including a resistor for supplying to the input of said integrator a current proportional to a first input voltage, means for producing constant currents of opposite polarities, means for switching alternately one and the other of said constant currents of opposite polarities to said integrator input, a source of constant frequency pulses, a multivibrator responsive to the output of said integrator and to said constant frequency pulses for generating at said constant frequency rectangular waves having durations that vary in accordance with said integrator output, means for applying said rectangular waves to said switching means to make the resultant current at said integrator input substantially zero, additional means for producing additional currents proportional to a second input voltage and of opposite polarities, an output terminal, additional means for switching alternately one and the other of said additional currents to said output terminal, and means for applying said rectangular waves to said additional switching means.

8. In combination, means for producing periodic signals of predetermined frequency, an output terminal, means for switching intermittently said periodic signals to said output terminal, means for generating at a predetermined frequency harmonically related to the frequency of said periodic signals switching signals having a predetermined phase relationship with said periodic signals, and means for applying said switching signals to said switching means to control the switching of said periodic signals.

9. Computer apparatus for deriving a mathematical function of a variable signal comprising means for generating a periodic voltage of predetermined frequency in accordance with said mathematical function, an input channel for receiving said periodic voltage, an output channel, switching means for intermittently coupling said input channel to said output channel, means receiving a variable signal for generating at a constant frequency harmonically related to said predetermined frequency switching signals having a predetermined phase relationship with said periodic voltage and varying as a time function of said variable signal, and means for applying said switching signals to said switching means to control the coupling of said input channel to said output channel.

10. Computer apparatus as recited in claim 9 wherein said means for generating a periodic voltage of predetermined frequency in accordance with said mathematical function is a sine wave generator.

11. Computer apparatus comprising means for generating first and second periodic voltages having the same waveform and the same predetermined frequency and having a predetermined phase difference, first and second channels, for respectively receiving said first and second voltages, an output channel, switching means for alternately coupling said first and second channels to said output channel, means receiving an input signal for generating at a constant frequency related to said predetermined frequency switching signals having a predetermined phase relationship with said periodic voltages and varying as a time function of said input signal, and means for applying said switching signals to said switching means to control the coupling of said first and second channels to said output channel.

12. Computer apparatus as recited in claim 11 wherein said first and second periodic voltages have a sine waveform and a phase difference of 180 degrees.

13. Computer apparatus as recited in claim 12 wherein said switching signals are rectangular waves having a duration that varies with said input signal.

14. Computer apparatus comprising means for generating at a predetermined frequency a periodic voltage, means for inverting the phase of said periodic voltage to provide a phase inverted voltage, first and second channels for respectively receiving said phase and said phase inverted voltages, an output channel including amplifier means, switching means responsive to rectangular wave impulses of one and the opposite polarities for respectively coupling one and the other of said first and second channels to said output channel, input means for receiving an input voltage, means responsive to said input voltage for generating at said predetermined frequency rectangular wave impulses whose durations are proportionally related to the amplitude of said input voltage, and means for applying said rectangular wave impulses as switching signals to said switching means.

15. Computer apparatus as recited in claim 14 wherein said means for generating rectangular wave impulses includes means responsive to said periodic voltage for generating trigger impulses at said predetermined frequency, and a multivibrator circuit responsive to said trigger impulses for generating said rectangular wave impulses.

16. Computer apparatus as recited in claim 15 wherein said means for generating rectangular wave impulses further includes an integrator, means for supplying to the input of said integrator a current proportional to said input voltage, means for producing constant currents of opposite polarities, means for switching alternately one and the other of said constant currents of opposite polarities to said integrator input, said multivibrator being further responsive to the output of said integrator for generating said rectangular wave impulses, and means for applying said rectangular wave impulses to said current switching means.

References Cited in the file of this patent

UNITED STATES PATENTS

| | | |
|---|---|---|
| 2,401,447 | Wipff | June 4, 1946 |
| 2,643,819 | Lee et al. | June 30, 1953 |
| 2,661,153 | Vance | Dec. 1, 1953 |
| 2,678,425 | Hoeppner | May 11, 1954 |
| 2,710,348 | Baum et al. | June 17, 1955 |
| 2,773,641 | Baum | Dec. 11, 1956 |